(12) United States Patent
Martinez et al.

(10) Patent No.: US 8,194,682 B2
(45) Date of Patent: Jun. 5, 2012

(54) MULTIPLE PROTOCOL LAND MOBILE RADIO SYSTEM

(75) Inventors: Dennis Michael Martinez, Westford, MA (US); John Vaughan, Pepperell, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 427 days.

(21) Appl. No.: 11/500,554

(22) Filed: Aug. 7, 2006

(65) Prior Publication Data

US 2008/0031207 A1 Feb. 7, 2008

(51) Int. Cl.
*H04L 12/28* (2006.01)

(52) U.S. Cl. ........................ 370/401; 370/310; 455/432.1

(58) Field of Classification Search .................. 370/310, 370/401; 455/432.1–432.2
See application file for complete search history.

(56) References Cited

U.S. PATENT DOCUMENTS

| | | |
|---|---|---|
| 4,845,504 A | 7/1989 | Roberts et al. |
| 4,852,086 A | 7/1989 | Eastmond et al. |
| 4,955,083 A | 9/1990 | Phillips et al. |
| 5,265,264 A | 11/1993 | Dzung et al. |
| 5,479,480 A | 12/1995 | Scott |
| 5,790,527 A | 8/1998 | Janky et al. |
| 5,805,645 A | 9/1998 | Przelomiec et al. |
| 5,862,486 A | 1/1999 | Przelomiec |
| 5,870,149 A | 2/1999 | Comroe et al. |
| 5,915,212 A | 6/1999 | Przelomiec et al. |
| 5,930,723 A | 7/1999 | Heiskari et al. |
| 5,995,515 A | 11/1999 | Suzuki |
| 6,002,941 A | 12/1999 | Ablay et al. |
| 6,009,553 A | 12/1999 | Martinez et al. |
| 6,023,626 A | 2/2000 | Kinnunen et al. |
| 6,035,196 A | 3/2000 | Hengeveld et al. |
| 6,041,048 A | 3/2000 | Erickson et al. |
| 6,084,919 A | 7/2000 | Kleider et al. |
| 6,144,647 A | 11/2000 | Lopez-Torres |
| 6,163,710 A | 12/2000 | Blaser et al. |
| 6,215,778 B1 | 4/2001 | Lomp et al. |
| 6,253,082 B1 | 6/2001 | Hengeveld |
| 6,301,263 B1 | 10/2001 | Maggenti |
| 6,351,653 B1 | 2/2002 | Alberth, Jr. et al. |
| 6,373,828 B1 | 4/2002 | Stewart et al. |
| 6,373,946 B1 | 4/2002 | Johnston |

(Continued)

FOREIGN PATENT DOCUMENTS

EP  0 848 565 A2  6/1998

(Continued)

OTHER PUBLICATIONS

Ericsson, "Communication and Information Services for National Security and Public Safety", White Paper, Apr. 2005, pp. 1-25. XP-002397357.

(Continued)

*Primary Examiner* — Patrick Edouard
*Assistant Examiner* — Michael Irace
(74) *Attorney, Agent, or Firm* — Fox Rothschild, LLP; Robert J. Sacco (57) ABSTRACT

A multiple protocol land mobile radio (LMR) and a method for communicating LMR content are provided. The method includes communicating the LMR content using a plurality of LMR transport protocols within a single LMR network. The method further includes encapsulating the LMR content based on an LMR application layer protocol for a portion of the single LMR network through which the LMR content is to be communicated.

18 Claims, 5 Drawing Sheets

U.S. PATENT DOCUMENTS

| | | |
|---|---|---|
| 6,449,491 B1 | 9/2002 | Dailey |
| 6,477,150 B1 | 11/2002 | Maggenti et al. |
| 6,515,997 B1 | 2/2003 | Feltner et al. |
| 6,549,587 B1 | 4/2003 | Li |
| 6,591,084 B1 | 7/2003 | Chuprun et al. |
| 6,611,536 B1 | 8/2003 | Ahmed |
| 6,683,881 B1* | 1/2004 | Mijares et al. .............. 370/401 |
| 6,757,266 B1 | 6/2004 | Hundscheidt |
| 6,775,337 B2 | 8/2004 | Janky et al. |
| 6,788,946 B2 | 9/2004 | Winchell et al. |
| 6,826,414 B1 | 11/2004 | Reynolds et al. |
| 6,831,903 B2 | 12/2004 | Kang |
| 6,865,372 B2 | 3/2005 | Mauney et al. |
| 6,912,387 B2 | 6/2005 | Haas et al. |
| 6,928,067 B1 | 8/2005 | Hameleers et al. |
| 6,928,294 B2 | 8/2005 | Maggenti et al. |
| 6,937,589 B2 | 8/2005 | Taketsugu |
| 7,031,286 B1 | 4/2006 | Hall et al. |
| 7,050,786 B2 | 5/2006 | Caci |
| 7,050,787 B2 | 5/2006 | Caci |
| 7,061,894 B2 | 6/2006 | Pang et al. |
| 7,065,058 B1 | 6/2006 | Korus |
| 7,079,857 B2 | 7/2006 | Maggenti et al. |
| 7,130,282 B2 | 10/2006 | Black |
| 7,149,552 B2 | 12/2006 | Lair |
| 7,218,630 B1 | 5/2007 | Rahman |
| 7,221,660 B1 | 5/2007 | Simonson et al. |
| 7,239,867 B2 | 7/2007 | Kotzin et al. |
| 7,245,927 B2 | 7/2007 | Hansen |
| 7,250,830 B2 | 7/2007 | Layne et al. |
| 7,305,240 B2 | 12/2007 | Chou et al. |
| 7,307,963 B2 | 12/2007 | Chow et al. |
| 7,333,829 B2 | 2/2008 | Malone et al. |
| 7,443,965 B2 | 10/2008 | Blossom et al. |
| 7,460,510 B2 | 12/2008 | Olivier et al. |
| 7,483,416 B2 | 1/2009 | Olivier et al. |
| 7,489,698 B2 | 2/2009 | Blossom et al. |
| 7,492,734 B2 | 2/2009 | Mathis et al. |
| 7,492,737 B1 | 2/2009 | Fong et al. |
| 7,864,725 B2 | 1/2011 | Li et al. |
| 2001/0046214 A1 | 11/2001 | Kang |
| 2002/0086665 A1* | 7/2002 | Maggenti et al. ............. 455/416 |
| 2002/0086701 A1 | 7/2002 | Salmi et al. |
| 2002/0093928 A1 | 7/2002 | LoGalbo et al. |
| 2002/0101859 A1 | 8/2002 | Maclean |
| 2002/0115475 A1 | 8/2002 | Abrol et al. |
| 2002/0151321 A1 | 10/2002 | Winchell et al. |
| 2002/0161841 A1 | 10/2002 | Kinnunen |
| 2002/0196781 A1* | 12/2002 | Salovuori .............. 370/352 |
| 2003/0012217 A1 | 1/2003 | Andersson et al. |
| 2003/0053434 A1 | 3/2003 | Chow et al. |
| 2003/0058827 A1 | 3/2003 | Chow et al. |
| 2003/0119498 A1 | 6/2003 | Haas et al. |
| 2003/0134638 A1* | 7/2003 | Sundar et al. ............. 455/435 |
| 2003/0148785 A1 | 8/2003 | Mangal et al. |
| 2003/0156578 A1 | 8/2003 | Bergenlid et al. |
| 2003/0169768 A1 | 9/2003 | Bienn et al. |
| 2003/0177245 A1 | 9/2003 | Hansen |
| 2003/0189950 A1 | 10/2003 | Spear et al. |
| 2003/0190932 A1 | 10/2003 | Pulkkinen et al. |
| 2003/0198198 A1 | 10/2003 | Echavarri et al. |
| 2004/0032843 A1 | 2/2004 | Schaefer et al. |
| 2004/0121729 A1 | 6/2004 | Herndon et al. |
| 2004/0121781 A1* | 6/2004 | Sammarco .............. 455/456.1 |
| 2004/0190468 A1 | 9/2004 | Saijonmaa |
| 2004/0196861 A1 | 10/2004 | Rinchiuso et al. |
| 2004/0202940 A1 | 10/2004 | Kramer et al. |
| 2004/0203938 A1 | 10/2004 | Kulkarni |
| 2005/0058136 A1 | 3/2005 | Lothberg et al. |
| 2005/0070280 A1 | 3/2005 | Jung et al. |
| 2005/0073964 A1 | 4/2005 | Schmidt et al. |
| 2005/0078627 A1 | 4/2005 | Yoon et al. |
| 2005/0135348 A1 | 6/2005 | Staack |
| 2005/0143056 A1 | 6/2005 | Lyer et al. |
| 2005/0157673 A1 | 7/2005 | Verma et al. |
| 2005/0159107 A1 | 7/2005 | Mauney et al. |
| 2005/0176473 A1 | 8/2005 | Melpignano |
| 2005/0180418 A1 | 8/2005 | Andersen et al. |
| 2005/0197101 A1 | 9/2005 | Gupta |
| 2005/0232241 A1 | 10/2005 | Wu et al. |
| 2005/0233776 A1 | 10/2005 | Allen et al. |
| 2005/0243785 A1 | 11/2005 | Sabat, Jr. et al. |
| 2005/0243857 A1 | 11/2005 | Hofstaedter et al. |
| 2006/0002372 A1 | 1/2006 | Smith |
| 2006/0013191 A1 | 1/2006 | Kavanagh |
| 2006/0035669 A1 | 2/2006 | Chuprun et al. |
| 2006/0077924 A1 | 4/2006 | Rune |
| 2006/0084457 A1 | 4/2006 | Laha et al. |
| 2006/0089180 A1 | 4/2006 | Salmi |
| 2006/0092865 A1* | 5/2006 | Williams ............ 370/310 |
| 2006/0104293 A1 | 5/2006 | Kopp et al. |
| 2006/0114890 A1 | 6/2006 | Martin Boys |
| 2006/0126635 A1 | 6/2006 | Alberth, Jr. et al. |
| 2006/0141939 A1 | 6/2006 | Nakada |
| 2006/0145781 A1 | 7/2006 | Layne et al. |
| 2006/0171307 A1 | 8/2006 | Gopalakrishnan et al. |
| 2006/0193295 A1 | 8/2006 | White et al. |
| 2006/0205398 A1 | 9/2006 | Seckendorf et al. |
| 2006/0209828 A1 | 9/2006 | Ng et al. |
| 2006/0221968 A1 | 10/2006 | Razdan et al. |
| 2006/0234762 A1 | 10/2006 | Ozluturk |
| 2006/0245425 A1 | 11/2006 | Mathis et al. |
| 2006/0262771 A1 | 11/2006 | Martinez et al. |
| 2006/0262800 A1 | 11/2006 | Martinez et al. |
| 2006/0280144 A1 | 12/2006 | Kangas |
| 2006/0281471 A1 | 12/2006 | Shaffer et al. |
| 2007/0037596 A1* | 2/2007 | Shaffer et al. ............. 455/518 |
| 2007/0049314 A1 | 3/2007 | Balachandran et al. |
| 2007/0072554 A1 | 3/2007 | Janky |
| 2007/0081637 A1 | 4/2007 | Beard et al. |
| 2007/0153789 A1 | 7/2007 | Barker, Jr. et al. |
| 2007/0173222 A1 | 7/2007 | Hansen |
| 2007/0201432 A1 | 8/2007 | Sood et al. |
| 2007/0207731 A1 | 9/2007 | Hansen |
| 2007/0242670 A1 | 10/2007 | Simonson et al. |
| 2007/0291744 A1 | 12/2007 | Lundberg et al. |
| 2008/0031207 A1 | 2/2008 | Martinez et al. |
| 2008/0031275 A1 | 2/2008 | Janky et al. |
| 2008/0075055 A1 | 3/2008 | Chow et al. |
| 2008/0146221 A1 | 6/2008 | Noldus |
| 2008/0159128 A1 | 7/2008 | Shaffer et al. |
| 2008/0175263 A1 | 7/2008 | Chen et al. |
| 2008/0205321 A1 | 8/2008 | Martinez |
| 2008/0214232 A1 | 9/2008 | Ozluturk |
| 2008/0218427 A1 | 9/2008 | Dobosz et al. |
| 2008/0298293 A1 | 12/2008 | Hiben et al. |
| 2008/0299942 A1 | 12/2008 | Goulder et al. |
| 2008/0317066 A1 | 12/2008 | Trine et al. |
| 2009/0005100 A1 | 1/2009 | Copeland |
| 2009/0024845 A1 | 1/2009 | Benshetler et al. |
| 2009/0215411 A1 | 8/2009 | Tucker et al. |

FOREIGN PATENT DOCUMENTS

| | | |
|---|---|---|
| EP | 0 848 565 A2 | 6/1998 |
| EP | 0 940 924 | 9/1999 |
| EP | 1612996 A1 | 1/2006 |
| GB | 2 315 193 | 1/1998 |
| JP | 62078925 | 4/1987 |
| KR | 1020020025170 | 4/2002 |
| WO | WO-95/23485 A1 | 8/1995 |
| WO | WO 97/36445 | 10/1997 |
| WO | WO-98 57482 A1 | 12/1998 |
| WO | W/O 01/45310 | 6/2001 |
| WO | WO 01/52563 A2 | 7/2001 |
| WO | WO 02/28131 A1 | 4/2002 |
| WO | WO 02/084913 A1 | 10/2002 |
| WO | WO 03/015431 A1 | 2/2003 |
| WO | WO-2005/391112 | 4/2005 |
| WO | WO 2006/125043 A1 | 11/2006 |
| WO | WO 2006/125044 A1 | 11/2006 |
| WO | W/O 2007/021586 | 2/2007 |

OTHER PUBLICATIONS

Boukalov, Adrian, "Cross Standard System for Future Public Safety and Emergency Communications". Vehicular Technology Conference, 2004, VTC2004-Fall, 2004 IEEE 60th Los Angeles, CA, USA Sep. 26-29, 2004, Piscataway, NJ, USA, IEEE, pp. 5224-5229.

Tattersall, P R, "Professional Mobile Radio—The BT Airways Public Safety Service and the Path for Technology and Service Evolution", BT Technology Journal, Springer, Dordrecht, NL, vol. 19, No. 1, Jan. 1, 2001, pp. 142-148. XP-001006588.

United States Statutory Invention Registration No. H1641; Sharman; "Connection of Mobile Devices to Heterogenous Networks"; Published Apr. 1, 1997; 16 pages.

Software-Enabled Wireless Interoperability Assessment Report—Voice-over-IP Technology, Dec. 2001, www.safecomprogram.gov/NR/rdonlyres/65398E2E-C4EE-4779-BB91-600847499056/0/voip_technology_assessment.pdf.

"The Authoritative Dictionary of IEEE Standard Terms", Standards Information Network IEEE Press, Seventh Edition, p. 378.

International Search Report mailed Sep. 15, 2006; Application Serial No. PCT/US06/019157, dated May 17, 2006.

M/A Com, Inc., VIDA Network Solutions—The IP Network Approach to Your Critical Communications, [online], May 18, 2004, pp. 1-8, XP-002619659, [retrieved on Feb. 1, 2011]. Retrieved from the Internet: < URL:http://www.racom.net/Downloads/VIDA_Brochure.pdf>.

M/A Com Inc.: P25IP—Expanding Digital Communications, [online] May 18, 2004, pp. 1-4, XP-002619660, [retrieved on Feb. 1, 2011]. Retrieved from the Internet: < URL:http://www.racom.net/Downloads/P25_Brochure.pdf>.

European Search Report mailed Mar. 3, 2011, Application Serial No. 1001.5389.9.

European Search Report mailed Feb. 24, 2011, Application Serial No. 10015388.1.

Information about Related Patents and Patent Applications, see section 6 of the accompanying information Disclosure Statement Letter, which concerns Related Patents and Patent Applications.

International Search Report, International Application No. PCT/US2007/017459, International Filing Date Aug. 6, 2007.

Whitepaper, Mobitv, "ATSC-M/H: The Promise of Free to Air Mobile Simulcast" found at <<http://www.mobitv.com/technology/whitepapers/ATSC.PDF on Mar. 13, 2009.

* cited by examiner

MULTIPLE PROTOCOL LAND MOBILE RADIO SYSTEM

BACKGROUND OF THE INVENTION

This invention relates generally to land mobile radios, and more particularly, to a system for providing land mobile radio (LMR) services using multiple LMR communication protocols.

Land mobile radios may be used to provide communication between different mobile units, for example, land mobile radios in different vehicles. Land mobile radio band communication, for example, public safety radio communication (e.g., police, fire department, etc.) is generally available within the VHF, UHF, 700 MHz and 800 MHz frequency bands. Part of each of these frequency bands is allocated by the Federal Communications Commission (FCC) for public safety communication services and are also referred to as Public Safety Frequency Bands. These communications also may be provided using private land mobile radio services (PLMRS).

Traditionally, LMR networks have been used to provide mission critical applications such as public safety communications. In addition to providing a very high level of system availability, LMR networks are designed to support PTT services, such as a dispatch mode of operation. These LMR systems use specialized LMR airlink protocols to communicate wirelessly between LMR radios and the LMR infrastructure.

Known LMR systems use a single protocol for the various layers in the communication protocol stack. For example, the same protocol must be used for both a transport layer and an application layer of the protocol stack. Further, when trying to interconnect multiple systems, with each system using a different protocol, transcoding and trascryption of the communicated LMR content is needed. Thus, design of these systems may result in sub-optimal performance and the cost of these systems may be increased.

BRIEF DESCRIPTION OF THE INVENTION

In one exemplary embodiment, a method for communicating land mobile radio (LMR) content is provided. The method includes communicating the LMR content using a plurality of LMR transport protocols within a single LMR network. The method further includes encapsulating the LMR content based on an LMR application layer protocol for a portion of the single LMR network through which the LMR content is to be communicated.

In another exemplary embodiment, a wireless communication system is provided that includes a land mobile radio (LMR) infrastructure configured to communicate with a plurality of LMR units within a plurality of coverage areas of an LMR system. At least some of the plurality of coverage areas have different transport protocols. The wireless communication system further includes an interface configured to process received LMR content that is communicated using a first LMR transport protocol and reencapsulate the LMR content for communication using a second LMR transport protocol.

In yet another exemplary embodiment, a land mobile radio (LMR) unit is provided that includes at least one voice encode/decoder and a plurality of modems connected to the at least one voice encoder/decoder. The plurality of modems are each configured to communicate using a different LMR transport protocol.

DETAILED DESCRIPTION OF THE INVENTION

Various embodiments of the invention include a system for providing land mobile radio (LMR) content, for example, LMR services via an LMR network using multiple communication protocols. More particularly, multiple LMR transport layer protocols are used to communicate LMR that can retain a single LMR application layer protocol.

It should be noted that when reference is made herein to LMR content, this refers generally to any type or kind of LMR voice and/or data content, and may define particular LMR services, operations, controls, etc. For example, the LMR content may include, but is not limited to, voice data, emergency signal data, control data relating to selecting a particular talk group, LMR data for transfer between a radio unit and a server, reprogramming data (e.g., software upgrade data), etc.

Figure 1:
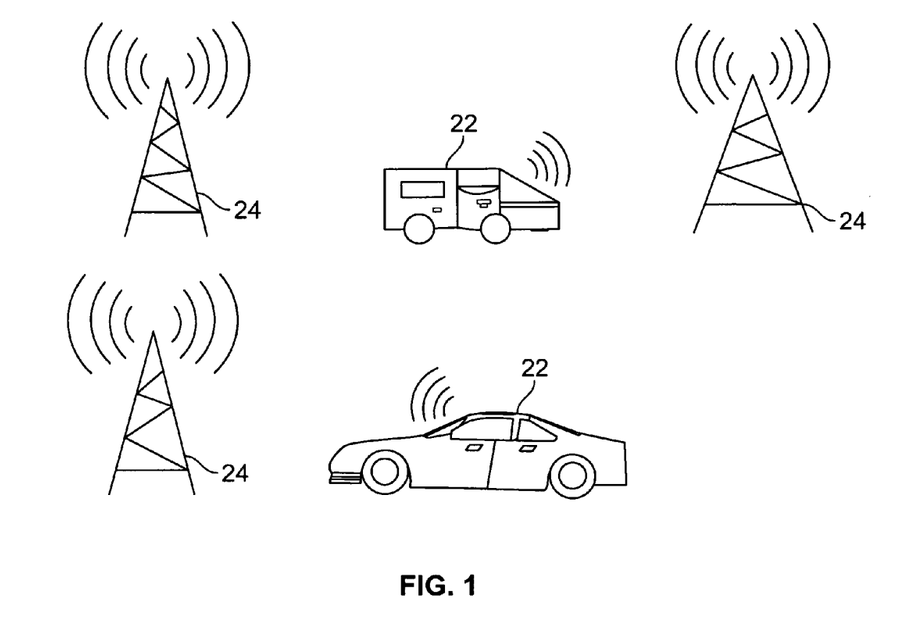
FIG. 1 is a diagram illustrating a Land Mobile Radio (LMR) communication system constructed in accordance with an exemplary embodiment of the invention.

Specifically, as shown in FIG. 1, a wireless communication system, and more particularly, an LMR communication system 20 constructed according to various embodiments of the invention provides communication between a plurality of LMR units or LMR terminals (not shown), which may be configured for mobile operation, such as located in various vehicles 22. Communication between the LMR units, for example, located in different vehicles 22 is provided via an LMR network having a communication coverage area defined by a plurality of communication base stations and associated communication towers 24, for example, as part of communication repeater towers. Within the LMR coverage area, Radio Frequency (RF) coverage is provided by each of the base stations 24. The RF coverage may overlap.

In various embodiments, the communication protocol provided by different base stations and associated communication towers 24 may be different. More particularly, the transmission protocol, and specifically, a transport layer protocol is different for some of the base stations and associated communication towers 24. For example, one base station and associated communication tower 24 may use a Terrestrial Trunked Radio (TETRA) transport protocol (e.g., ETSI TETRA standard) for the RF coverage area of that base station and associated communication tower 24 and another base station may use a P25 transport protocol (e.g., Project 25 (TIA 102) standard) for the RF coverage area of that base station and associated communication tower 24. It should be noted that some of the base stations and associated communication towers 24 may use the same transport protocol. Additionally, it should be noted that other types of LMR communication protocols and standards may be used, including, for example, M/A-COM OpenSky and EDACS protocols.

In operation, each of the LMR units is configured to communicate LMR content via the LMR communication system 20 using different communication protocols. In particular, and as described in more detail herein, the LMR units select between one of a plurality of transport layer protocols for use in communicating the LMR content (that may be different than an application layer protocol). The LMR content is then configured for communication using the selected communication protocol, and more particularly, encapsulated based on the selected communication protocol. Additionally, different application layer protocols may be used.

Figure 2:
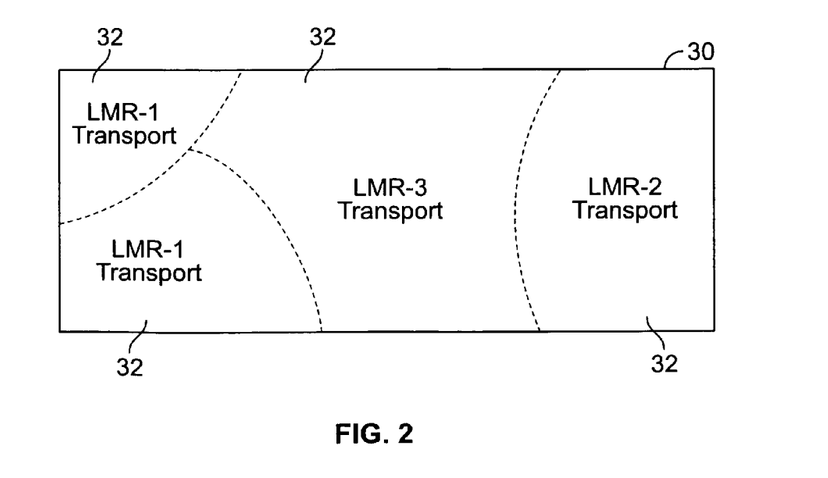
FIG. 2 is a diagram illustrating coverage areas of a portion of the LMR communication system of FIG. 1.

The LMR communication system 20 may include one or more communication areas 30, a portion of one communication area is shown in FIG. 2. The communication area 30 is formed from a plurality of RF coverage areas 32 that are serviced by one or more base stations and associated communication towers 24 (shown in FIG. 1). Each coverage area 32 may be configured to communicate LMR content using a different transport layer protocol, shown as LMR-1 Transport, LMR-2 Transport and LMR-3 Transport, indicating that three different transport layer protocols are being used. It should be noted that adjacent RF coverage areas 32 may use the same or different transport layer protocols.

Figure 3:
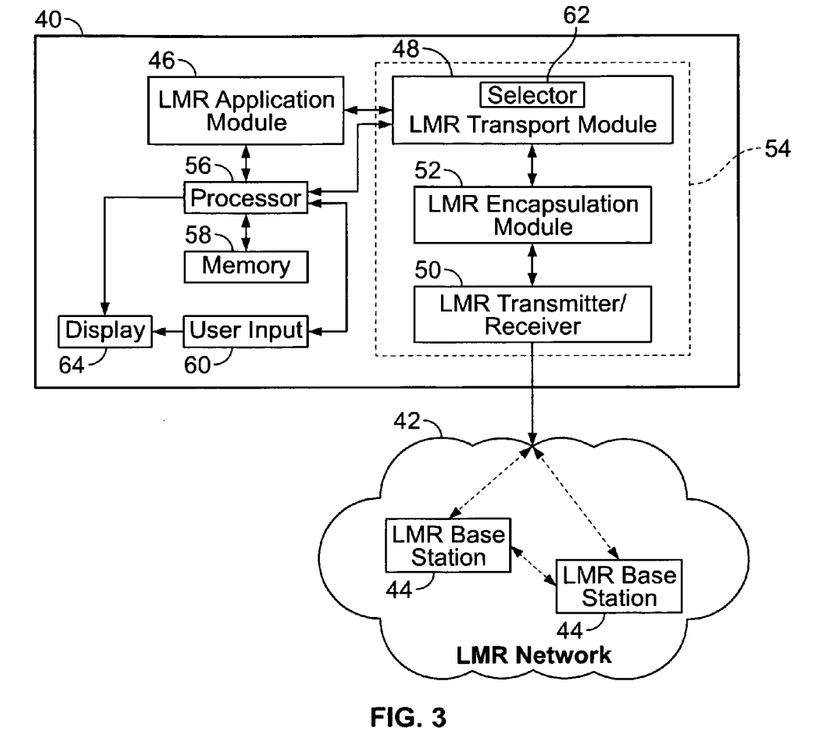
FIG. 3 is a block diagram of a Land Mobile Radio (LMR) unit constructed in accordance with an exemplary embodiment of the invention communicating with an LMR network.

Various embodiments enable end-to-end LMR services to be provided over a plurality of protocols, for example, a plurality of radio and/or airlink protocols. In general, an LMR unit 40 (also referred to as an LMR terminal) as shown in FIG. 3 is configured to allow operating end-to-end LMR application layer protocols and services between the LMR units 40 and an LMR network 42 that may include a plurality of LMR base stations 44, each of which may be configured to communicate using a different protocol.

More particularly, the LMR unit 40 includes a plurality of modules or components configured to provide communication via the LMR network 42. Specifically, the LMR unit 40 includes an LMR application module 46 connected to an LMR transport module 48 together provided for configuring voice and/or data for communication via the LMR network 42 (having one or more LMR base stations 44) using an LMR transmitter/receiver 50, which may be separate units or provided as a single transceiver. The LMR unit 22 further includes an LMR encapsulation module 50 connected between the LMR transport module 48 and the LMR transmitter receiver 50 for encapsulating the voice and/or data for communication using one of a plurality of communication protocols. The LMR transport module 48, the LMR encapsulation module 52 and the LMR transmitter/receiver 50 generally define a multiple protocol communication portion 54.

The LMR unit 40 may include additional components, for example, an antenna (not shown) for use in transmitting and receiving signals as is known. Additionally, and for example, the LMR unit 40 may include filters (not shown), such as a receive filter and a transmit filter for filtering signals that are received and transmitted, respectively, by the LMR unit 40. The LMR unit 40 also may include components for processing LMR content and for interfacing with a user. For example, a processor 56 connected to a memory 58 may be configured to receive the different LMR content and based on a user input 60 or other information (e.g., configuration or protocol description information in the LMR content signal) determine the manner is which to encapsulate or decapsulate the LMR content as described in more detail below. For example, the processor 56 may be configured to communicate control commands to a selector 62 of the LMR transport module 48 to select a protocol for use in communicating the LMR content. A display 64 also may be provided and configured to display, for example, the current channel, frequency, mode of communication, type of communication, communication protocol, etc, for the LMR unit 40.

In operation, the LMR communication system 20 with the LMR unit 40 may provide communication via the LMR network 42 using different known protocols, for example, LMR airlink protocols within a single LMR network 42. For example, these LMR airlink protocols include the Project 25 (TIA 102) and ETSI TETRA standards, among others. These LMR airlink protocols specify the format and procedures for information exchange between the LMR unit 40 and the LMR network 42, and in particular, the LMR base stations 44. It should be noted that when the base station(s) 44 are part of a larger system, the base station(s) 44 are interconnected to switching equipment (not shown) that routes voice and data between different parts of the system, such as to other LMR base stations or dispatch consoles. As is known, the LMR base station 44 processes, for example, manipulates, the voice, data and control information received over the airlink into an alternate format suitable for communication within the LMR network 42, for example, for transport to switching equipment.

Figure 4:
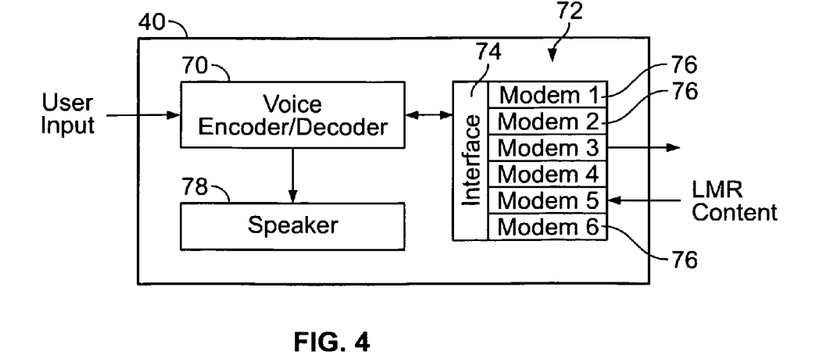
FIG. 4 is a block diagram of Land Mobile Radio (LMR) unit constructed in accordance with another exemplary embodiment of the invention.

For example, based on the current RF coverage area 32 (shown in FIG. 2) and associated communication protocol, which may be automatically determined (e.g., using header information in the LMR signal) or manually selected (e.g., selected by a user), LMR content is first generated by the LMR application module 46 based on an application layer and then encapsulated by the LMR encapsulation module 52 based on a transport layer as selected by the LMR transport module 48. It should be noted that when LMR content is communicated through the LMR network 42, the encapsulation of the transport layer may change based on, for example, the protocol used by the current LMR base station 44, but the encapsulation of the application layer remains unchanged. Accordingly, in various embodiments, the LMR unit 40 is configured having at least one voice encoder/decoder 70 connected to a multiple protocol communication portion 72 as shown in FIG. 4. In this embodiment, the multiple protocol communication portion 72 includes an interface 74 for communicating with the voice encoder/decoder 70 and a plurality of modems 76 each configured to communicate using a different LMR communication protocol. The number of modems 76 or other communication units may be modified, for example, increased or decreased. Additionally, a single communication unit configured to communicate using a plurality of different communication protocols may be provided. Also, the voice encoder/decoder 70 may be modified or additional voice encoders/decoders 70 added if LMR content is to be communicated using different application layers. In addition, the LMR unit 40 may include a speaker 78 configured to output the decapsulated LMR content.

In operation, the LMR unit 40 either receives LMR content at the multiple protocol communication portion 72 or a user input (e.g., voice message via a microphone (not shown) or button depression input) at the voice encoder/decoder 70. For LMR content received at the multiple protocol communication portion 72, the LMR content is decapsulated and processed, which may include decoding and decrypting the LMR content, and then output, for example, via the speaker 78. For inputs received at the voice encoder/decoder 70, the input, for example, is encoded (e.g., encapsulated based on an encapsulation layer) and then transmitted from the multiple protocol communication portion 72 using one of the plurality of modems 76 based on the communication protocol for that portion of the LMR network 42 (shown in FIG. 3) and as determined by a transport layer.

Figure 5:
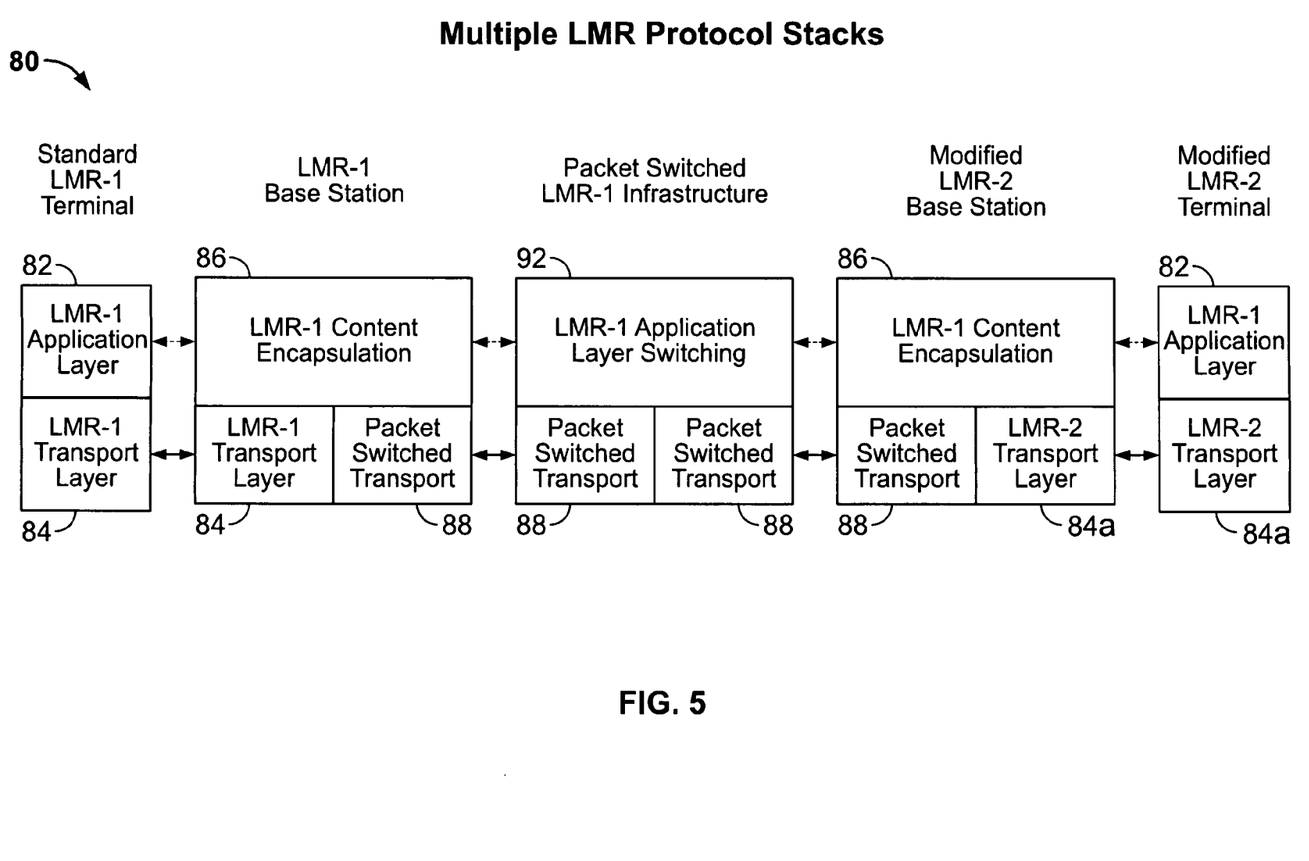
FIG. 5 is a block diagram illustrating protocol stacks in accordance with an exemplary embodiment of the invention.

Thus, communication of LMR content is communicated over the LMR network 42 and which may include transmitting and receiving using a plurality of different transport protocols and configuring the LMR content accordingly, for example, configuring the LMR content using different airlink protocols. In order to provide communication via the LMR network 42 using the LMR unit 40, the communication protocol stacks for communication using different protocols is partitioned as shown in FIG. 5. In particular, and with respect to communication with the LMR unit 40 using the LMR network 42, an LMR protocol stack 80 is partitioned into multiple layers, which in an exemplary embodiment, is a two-layer protocol stack having an LMR application layer 82 and an LMR transport layer 84. The LMR application layer 82 and the LMR transport layer 84 may be provided, for example, by the LMR application module 46 and LMR transport module 48 (both shown in FIG. 3), respectively. The LMR application layer 82 is configured to provide interpretation and processing of the voice, data and control information across the entire LMR network 42 and the LMR transport layer 84 is configured to provide delivery of the voice, data and control information over the transmission medium, which may be only over a portion of the LMR network 42 defined by a RF coverage area 32 (shown in FIG. 2). As described herein, an LMR airlink protocol defines at least one of the LMR application layer 82 and the LMR transport layer 84 for a particular portion of the LMR network 42, for example, an RF coverage area 32.

In this two-layer protocol stack model, the LMR base station 44 (shown in FIG. 3) and switching equipment in the LMR network 42 (shown in FIG. 3) receive content from the LMR unit 40 (shown in FIGS. 3 and 4) and communicate content of the LMR application layer 82 therebetween with a one or more different transport layers. In particular, and as shown in FIG. 5, the content of the application layer 82 is encapsulated at the LMR base station 42 (shown in FIG. 3) using LMR content encapsulation 86 as is known. In an exemplary embodiment, discrete transmission units are encapsulated within transport datagrams, and in particular, packet switched transport datagrams 88, that are communicated using one of a plurality of transport protocols. Upon receipt of an encapsulated datagram, the application layer content then may be recovered, and in particular, decapsulated.

Further, this two-layer protocol stack model enables delivering LMR application layer services over portions of the network using different transport layers defined by different communication protocols or a protocol different from the application layer. Specifically, as shown on the left side of FIG. 5, the application layer 82 and transport layer 84 are configured based on the same communication protocol, namely, LMR-1, which may be, for example, a Tetra based communication protocol. However, as shown on the right hand side of FIG. 5, the application layer 82 is the same, namely LMR-1, but the transport layer 84a is different, namely, LMR-2, which may be, for example, a P25 based communication protocol. Accordingly, the application layer content encapsulation is the same, but the transport layer encapsulation is different.

In particular, the LMR content encapsulation 86 is used with the packet switched transport datagrams 88 such that the LMR network 42 (shown in FIG. 3) can communicate with switching equipment using suitable transport protocols, thereby delivering the identical LMR application layer services over the LMR network 42 using LMR base stations 44 (shown in FIG. 3) configured to communicate using different LMR communication protocols. Specifically, the LMR infrastructure communicates the LMR application services using an LMR application layer switching 92 in combination with packet switched transport datagrams 68 with different transport layers 84 and 84a.

It should be noted that the various embodiments are not limited to a two-layer protocol stack and additional layers may be provided to the multi-layer protocol stack as desired or needed. For example, different session layers, such as a bulk encryption layer may be provided. Further, and for example, an RTP layer may be provided. Further, it should be noted that although the example in FIG. 5 is shown as providing communication using (i) the same protocol for both the application layer and transport layer and (ii) a different protocol for the transport layer, modifications are contemplated in the various embodiments. For example, the same transport layer may be used with different application layers.

Figure 6:
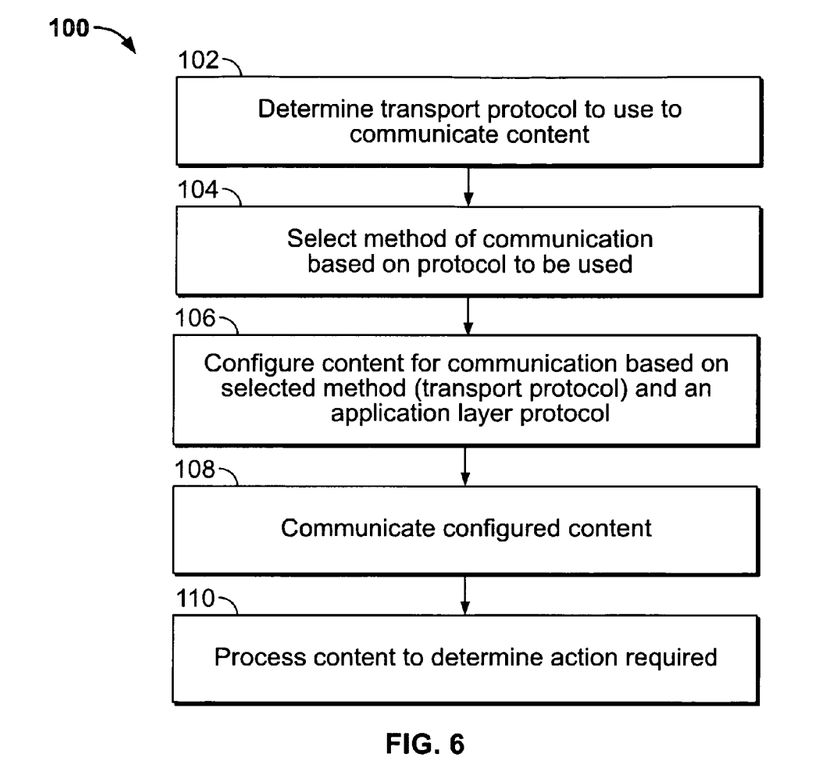
FIG. 6 is a flowchart of a method for controlling communication of LMR content in an LMR communication system in accordance with an exemplary embodiment of the invention.

Various embodiments of the invention provide for controlling communication of LMR content in an LMR communication system using an LMR network having a plurality of LMR base stations or other repeaters or routers that may use different communication protocols. In particular, a method 100 of controlling communication of LMR content is shown in FIG. 6 and includes determining at 102 the protocol to use to communicate the LMR content, and more particularly, the transport layer protocol to use. In an exemplary embodiment, a determination is made as to the transport protocol for the current coverage area. The determination may be based on a manual selection, for example, based on a user input selection of which protocol to use or the inputted location of the LMR unit. The selection may be made, for example, using a button or switch on the LMR unit 40 (shown in FIG. 3). Alternatively or optionally, the determination of which protocol to use may be automatic. For example, the selection of a protocol for communicating LMR content may be based on the automatic location detection of the LMR unit (e.g., using GPS) or based on information received in the LMR content, for example, in a header portion of the LMR content, or in a setup or configuration message.

After a determination of the transport protocol to use to communicate the LMR content is made at 102, a method of communication is selected at 104 based on the determined protocol to use. For example, the speed or baud rate of the communication may be selected (manually or automatically) from a range of communication data rates. Additionally, the setup procedures for establishing and connecting to the determined portion of the network may be selected. For example, if a first communication protocol is to be used, an LMR-1 transport layer network communication setup routine may be executed wherein a communication link is established between the LMR unit and that portion of the LMR network via an LMR transmitter/receiver within the LMR unit. If a second communication protocol is to be used, an LMR-2 transport layer network communication setup routine may be executed wherein a communication link is established between the LMR unit and that different portion (different from the first portion) of the LMR network. The setup routine may include any suitable processes as are known for establishing a wireless communication link.

Thereafter, at 106 the LMR content is configured for communication based on application layer protocol and the selected method of communication. For example, if the LMR content is to be communicated using the LMR-1 transport layer, a selection of a particular LMR standard in which to configure or format the LMR content is selected. In particular, an LMR-1 standard in which to configure the voice and/or data payload defining the LMR content is selected. This may include, for example, selecting one of a Project 25 (TIA 102) or an ETSI TETRA standard for the method of communication and encapsulating the data accordingly, for example, using IP wrapper encapsulation with a particular application layer protocol, for example, an LMR-1 application layer protocol. Further, and for example, a proprietary format may be selected, for example, an OpenSky MIA-COM proprietary format, a NetworkFirst or EDACS system proprietary format. A different communication protocol or format may be used, for example, if the portion of the LMR network requires communication in an LMR-2 standard.

Additionally, and as described in more detail above in connection with FIG. 5, depending on the protocol to be used to communicate the LMR content, a particular protocol stack may be used. Further, an LMR protocol header identifying the transport layer and protocol used to encapsulate the data may be added to the LMR data payload. As described in more detail below, the LMR content is encapsulated, for example, IP encapsulated with an IP wrapper prior to communication. It should be noted that this may include multiple layers of encapsulation.

Referring again to FIG. 6, after the LMR content is configured at 106, the configured LMR content is communicated at 108. For example, if the LMR content is configured for communication using an LMR-1 communication protocol, the modem corresponding to that protocol is used to communicate the LMR content from and with the LMR units. If the LMR content is configured for communication using, for example, another protocol such as an LMR-2 protocol, a different modem corresponding to that protocol is used to communicate the LMR content from and with the LMR units. It should be noted that the LMR unit may be configured to operate in two or more modes of operation, namely, in connection with two or more different communication protocols.

After the LMR content is communicated and received, for example, by a base station of the network, the LMR content is processed at 110 to determine an action. For example, this may include a determination to communicate voice data or to issue an emergency signal or PTT request to a talk group. Further and for example, if the LMR content is communicated using different transport layers, the IP destination address of an encapsulated datagram may first be determined and then communicated to that location for processing using a router in the network. The LMR content then may be reencapsulated.

Figure 7:
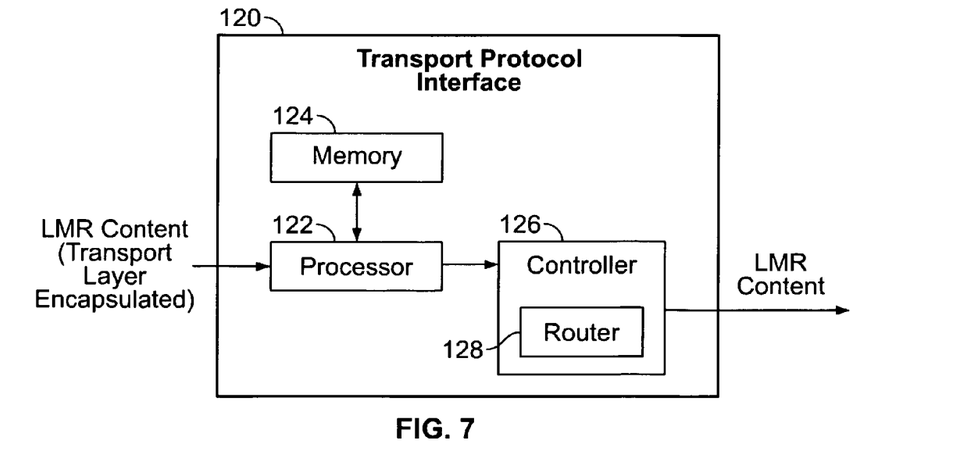
FIG. 7 is a block diagram of a transport protocol interface constructed in accordance with an exemplary embodiment of the invention.
Figure 8:
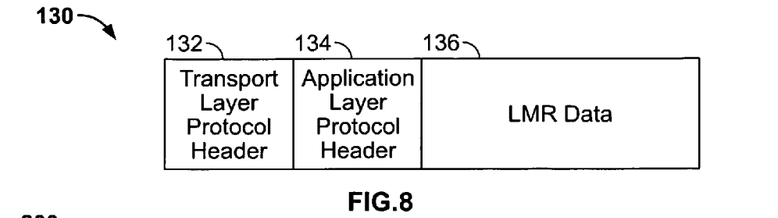
FIG. 8 is a block diagram showing formatted LMR content in accordance with an exemplary embodiment of the invention.

In the various embodiments, as shown in FIG. 7, a transport protocol interface 120 may be provided in connection with the base stations 44 (shown in FIG. 3). The transport protocol interface 120 may be provided, for example, as a separate unit (e.g., stand alone module), a card for connection to a server within the LMR network 42 (shown in FIG. 3) or software for downloading to a server within the LMR network 42. The transport protocol interface 120 includes a processor 122 for processing received encapsulated LMR content for communication within the infrastructure of the LMR network 42. In particular, and as described in more detail in connection with FIGS. 5 and 6, the processor may receive LMR content formatted as shown in FIG. 8. The LMR content generally includes an LMR data portion and a packet switching protocol encapsulation portion. Specifically, the LMR content 130 may include a transport layer protocol header 132, an application layer protocol header 134 and LMR data 136, for example, an LMR data payload.

This LMR content 130 is essentially encapsulated, for example, encapsulated in one or more IP wrappers such that different communication protocols may be used to communication the LMR content 130. The processor 122 decapsulates the LMR content 130, for example, by removing the transport layer protocol header 132 and may store the decapsulated LMR content 130 in a memory 124. The LMR content 130 then may be further processed by the processor 122 to determine an action to be performed or an address within the packet switched LMR infrastructure to which the LMR content 130 is to be communicated, which may include reencapsulation using a different transport layer identified by a different transport layer protocol header 132. Essentially, once the LMR content 130 is decapsulated, the LMR content 130 is configured for communication within the LMR infrastructure or within another portion of the LMR network 42. The control of communication of the LMR content 130 is controlled by a controller 126 that may include a router 128 for routing the LMR content 130 to a destination within, for example, the LMR network 42.

Figure 9:
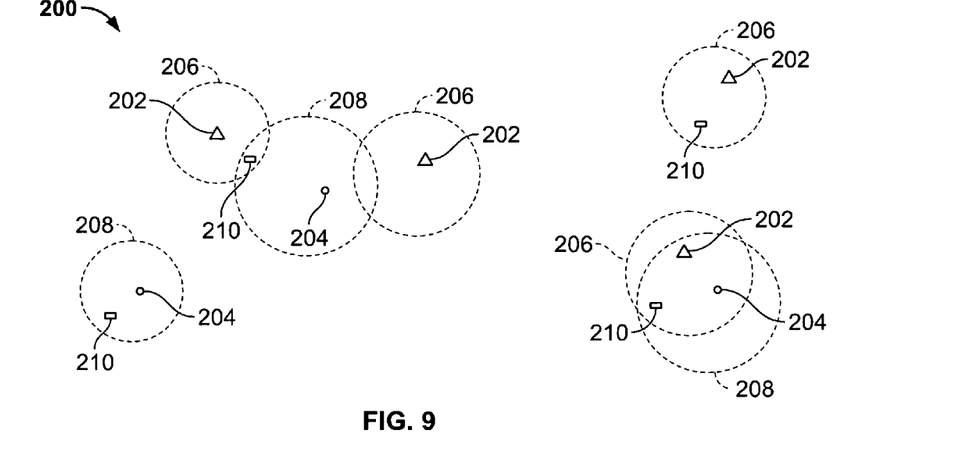
FIG. 9 is a block diagram of an LMR communication system constructed in accordance with an exemplary embodiment of the invention showing communication coverage areas.

Thus, various embodiments of the invention provide for communicating LMR content using one or more protocols within an LMR network. The content may be encapsulated for communication based on a plurality of different transport layers and communicated accordingly using one of a plurality of modems of an LMR unit. For example, and as shown in FIG. 9, an LMR communication system 200 generally includes a plurality of LMR network base stations 202 configured to communicate using a first LMR communication protocol and a plurality of LMR network base stations 204 configured to communicate using a second LMR communication protocol. Each of the plurality of network base stations 202 and 204 have a corresponding coverage area 206 and 208, respectively. The communication coverage areas 206 and 208 may be overlapping at some locations. The various embodiments of the invention as described herein allow an LMR unit 210, for example, an LMR radio in a mobile unit or vehicle, to communicate via different LMR communication protocols (e.g., different transport layer protocols) depending on, for example, the location of the LMR unit 210 and the corresponding available coverage area. More particularly, communication towers (not shown) corresponding to each of the plurality of LMR network base stations 202 and 204 allow wireless communication as described herein.

Figure 10:
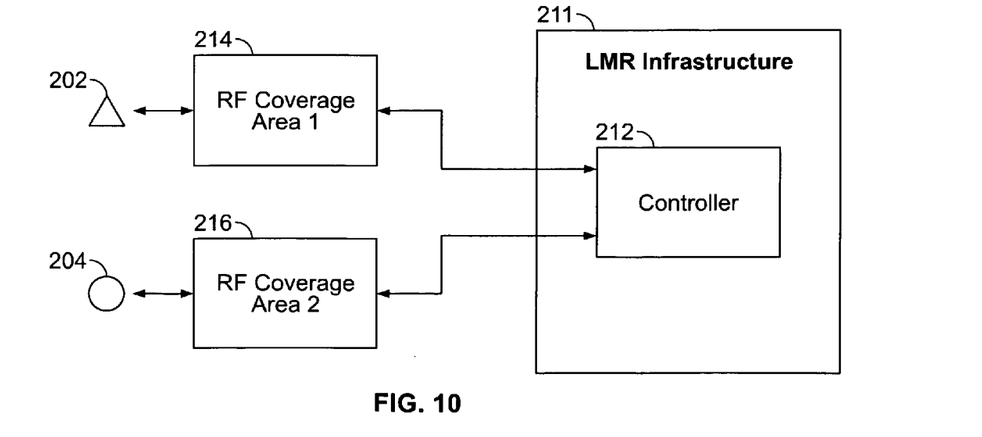
FIG. 10 is block diagram of an LMR communication system constructed in accordance with an exemplary embodiment of the invention showing data flow.

Further, as shown in FIG. 10, a controller 212 within an infrastructure 211 of an LMR network, for example, the LMR communication system 200 (shown in FIG. 9) may be configured to control communications from the plurality of LMR network base stations 202 and 204 as described herein. The controller may process a plurality of data packets received from different portions of the LMR network, for example, different RF coverage areas 214 and 216, having different communication or transport protocol requirements, to determine an appropriate action or routing procedure for the particular data packets as described herein. Accordingly, and for example, the various embodiments may provide for using a Tetra based communication protocol in urban areas for shorter range, higher capacity communications and a VHF based communication protocol in rural areas for longer range, lower capacity communications. Further, the transport layer may be selected based on the type or kind service.

The various embodiments or components, for example, the LMR communication systems, networks or controllers therein, may be implemented as part of one or more computer systems, which may be separate from or integrated with the LMR communication system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It also should be noted that the various embodiments of the invention also may provide different and/or additional functionality. For example, end-to-end encryption may be performed, thereby eliminating the use of intervening encryption equipment and the security risk encountered by having such intervening equipment with access to encryption keys. Further, various embodiments of the invention may provide end-to-end digital voice coding, thereby eliminating the use of intervening transcoding and transcription equipment and hence the fidelity loss encountered when one format is converted to another format.

While the invention has been described in terms of various specific embodiments, those skilled in the art will recognize that the invention can be practiced with modification within the spirit and scope of the claims.

What is claimed is:

1. A method for communicating land mobile radio (LMR) content, said method comprising:
    automatically detecting by a first LMR unit a location thereof;
    automatically selecting, by said first LMR unit, a first LMR network protocol from a plurality of LMR network protocols based on said location of said first LMR unit, said first LMR network protocol including a first application-layer protocol for an application layer of a first LMR protocol stack and a first transport-layer protocol for a transport layer of said first LMR protocol stack;
    generating, by said first LMR unit, said LMR content using a second application-layer protocol of a second LMR network protocol, said second LMR network protocol and said second application-layer protocol being respectively different than said first LMR network protocol and said first application-layer protocol;
    encapsulating, by said first LMR unit, said LMR content using said first transport-layer protocol;
    communicating the encapsulated LMR content over a first RF coverage area of an LMR network;
    re-encapsulating said LMR content using a second transport-layer protocol of said second LMR network protocol, said second transport-layer protocol different than said first transport-layer protocol; and
    forwarding said re-encapsulated LMR content over a second RF coverage area of said LMR network;
    wherein said second application-layer protocol is unchanged during communication of said LMR content over said second RF coverage area of said LMR network.

2. A method in accordance with claim 1, wherein said first LMR protocol stack is a two layer protocol stack for communicating the LMR content.

3. A method in accordance with claim 1 wherein the LMR content comprises content defining at least one of LMR services, operations and controls and including at least one of voice data, emergency signal data, control data relating to selecting a particular talk group, LMR data for transfer between a radio unit and a server and reprogramming data.

4. A method in accordance with claim 1 further comprising performing end-to-end encryption between a plurality of LMR units.

5. A method in accordance with claim 1 further comprising performing end-to-end digital voice encoding between a plurality of LMR units.

6. A method in accordance with claim 1 further comprising configuring the LMR content for communication using one of a Project 25 (TIA 102) protocol, an ETSI TETRA airlink protocol, an OpenSky proprietary format, an EDACS proprietary format, and a NetworkFirst format.

7. A method in accordance with claim 1, further comprising automatically selecting the second transport-layer protocol.

8. A wireless communication system comprising:
    a land mobile radio (LMR) infrastructure configured to communicate with a plurality of LMR units within a plurality of coverage areas of an LMR system, at least two of the plurality of coverage areas utilizing different transport-layer protocols for a transport layer of their respective LMR protocol stacks; and an interface facilitating an interconnection between said plurality of coverage areas, said interface configured to
receive LMR content from a first LMR unit of said plurality of LMR units, said LMR content generated by said first LMR unit using a first application-layer protocol of a first LMR network protocol and a first transport-layer protocol of a second LMR network protocol that is different than said first LMR network protocol, and
reencapsulate the LMR content using a second transport-layer protocol of said transport layer protocols that is different as compared to said first transport-layer protocol;

wherein said first application-layer protocol is unchanged by said interface and is different than a second application-layer protocol of said second LMR network protocol; and wherein the second LMR network protocol is automatically selected by said first LMR unit from a plurality of LMR network protocols based on an automatically detected location of said first LMR unit.

9. A wireless communication system in accordance with claim 8, wherein at least one of said LMR protocol stacks is a two layer protocol stack.

10. A wireless communication system in accordance with claim 8 wherein the LMR infrastructure is configured to communicate using one of a Project 25 (TIA 102) protocol, an ETSI TETRA airlink protocol, an OpenSky proprietary format, an EDACS proprietary format, and a NetworkFirst format.

11. A wireless communication system in accordance with claim 8 wherein the LMR infrastructure is configured to communicate LMR content comprising content defining at least one of LMR services, operations and controls and including at least one of voice data, emergency signal data, control data relating to selecting a particular talk group, LMR data for transfer between a radio unit and a server and reprogramming data.

12. A land mobile radio (LMR) unit comprising:
an application module configured to generate LMR content based on an application-layer protocol of a first LMR network protocol;
a selector configured to dynamically and automatically select a transport-layer protocol from a plurality of transport-layer protocols based on an automatically detected location of said LMR unit, said transport-layer protocol being part of a second LMR network protocol that is different from said first LMR network protocol;
an encapsulation module configured to encapsulate said LMR content based on said transport-layer protocol; and
at least one transceiver connected to the application module, the transceiver being configured to communicate said LMR content which was generated using said application-layer protocol of said first LMR network protocol and encapsulated using said transport-layer protocol of said second LMR network protocol;
wherein said application-layer protocol of said first LMR network protocol is different than an application-layer protocol of said second LMR network protocol.

13. An LMR unit in accordance with claim 12, further comprising an LMR transport layer module configured to provide the transport-layer protocol.

14. An LMR unit in accordance with claim 12, further comprising an LMR application layer module configured to provide the application-layer protocol of the first LMR network protocol.

15. A method for communicating land mobile radio (LMR) content, said method comprising:
selecting, by a first LMR unit, at least a first LMR network protocol from a plurality of different LMR network protocols, said first LMR network protocol including a first application-layer protocol for a first application layer of a first LMR protocol stack and a first transport-layer protocol for a transport layer of said first LMR protocol stack;
generating, by said first LMR unit, said LMR content using a second application-layer protocol of a second LMR network protocol, said second LMR network protocol and said second application-layer protocol being respectively different than said first LMR network protocol and said first application-layer protocol;
encapsulating, by said first LMR unit, said LMR content using said first transport-layer protocol;
communicating the encapsulated LMR content over a first RF coverage area of an LMR network;
processing, at a first network node of said LMR network, said encapsulated LMR content to generate a plurality of datagrams;
communicating said plurality of datagrams from said first network node to a second network node comprising a packet-switched infrastructure of said LMR network;
selecting, by said second network node, said second LMR network protocol from said plurality of different LMR network protocols based on an evaluation of a communication or transport protocol requirement, the second LMR network protocol including a second transport-layer protocol for said transport layer of a second LMR protocol stack, and said second transport-layer protocol being different than said first transport-layer protocol;
selecting, by said second network node, a routing procedure based on said second transport-layer protocol of said second LMR network protocol which was previously selected;
selectively routing said plurality of datagrams to a third network node which employs said second LMR network protocol;
re-encapsulating, by said third network node, said LMR content using said second transport-layer protocol; and
forwarding said re-encapsulated LMR content from said third network node to a second LMR unit existing within a second RF coverage area of said LMR network;
wherein said second application-layer protocol is unchanged during communication of said LMR content over said second RF coverage area of said LMR network.

16. The method in accordance with claim 1, wherein the location of the first LMR unit is automatically detected using a Global Positioning System.

17. The wireless communication system in accordance with claim 8, wherein the location of the first LMR unit is automatically detected using a Global Positioning System.

18. The LMR unit in accordance with claim 8, wherein location of the LMR unit is automatically detected using a Global Positioning System.

* * * * *